April 24, 1951 H. D. ELSE 2,550,111
SPEED-LIMITING DEVICE FOR DYNAMOELECTRIC MACHINES
Filed Nov. 4, 1949

WITNESSES:
H. F. Susser.
Wm. C. Groome

INVENTOR
Harry D. Else.
BY F. P. Lyle
ATTORNEY

Patented Apr. 24, 1951

2,550,111

UNITED STATES PATENT OFFICE 2,550,111

SPEED-LIMITING DEVICE FOR DYNAMO-ELECTRIC MACHINES

Harry D. Else, Lima, Ohio, assignor to Westinghouse Electric Corporation, East Pittsburgh, Pa., a corporation of Pennsylvania Application November 4, 1949, Serial No. 125,556

9 Claims. (Cl. 318—304)

The present invention relates to speed-limiting devices for dynamo-electric machines, and more particularly to a dynamo-electric machine having a speed-limiting device built into the machine to prevent overspeeding.

The principal object of the invention is to provide a dynamo-electric machine which has a speed-limiting device built into it, as an integral part of the machine, in order to limit the speed to a predetermined maximum and thus prevent dangerous or harmful overspeeding of the machine. Such a device is particularly useful in series motors, to prevent excessive speed at light load, or at no load, and in motors used for driving hoists, or in other applications where the motor may be driven by an overhanging load at a greater speed than its normal speed. It will be obvious, however, that the speed-limiting device of the present invention is not limited in its application to any particular type of motor, but may be used wherever it is necessary, or desirable, to limit the speed.

Another object of the invention is to provide a centrifugally actuated speed-limiting device for dynamo-electric machines, utilizing a disk element on the shaft of the machine which is moved axially into engagement with friction blocks, or other engaging means, on a stationary part of the machine when the speed exceeds a predetermined limit, in order to brake the machine and thus limit its speed.

A further object of the invention is to provide a dynamo-electric machine having a centrifugally actuated speed-limiting device combined with a ventilating fan for the machine, which is capable of dissipating the large amount of heat generated by the braking action of the device without allowing any part of the device to reach undesirably high temperatures.

Figure 1:
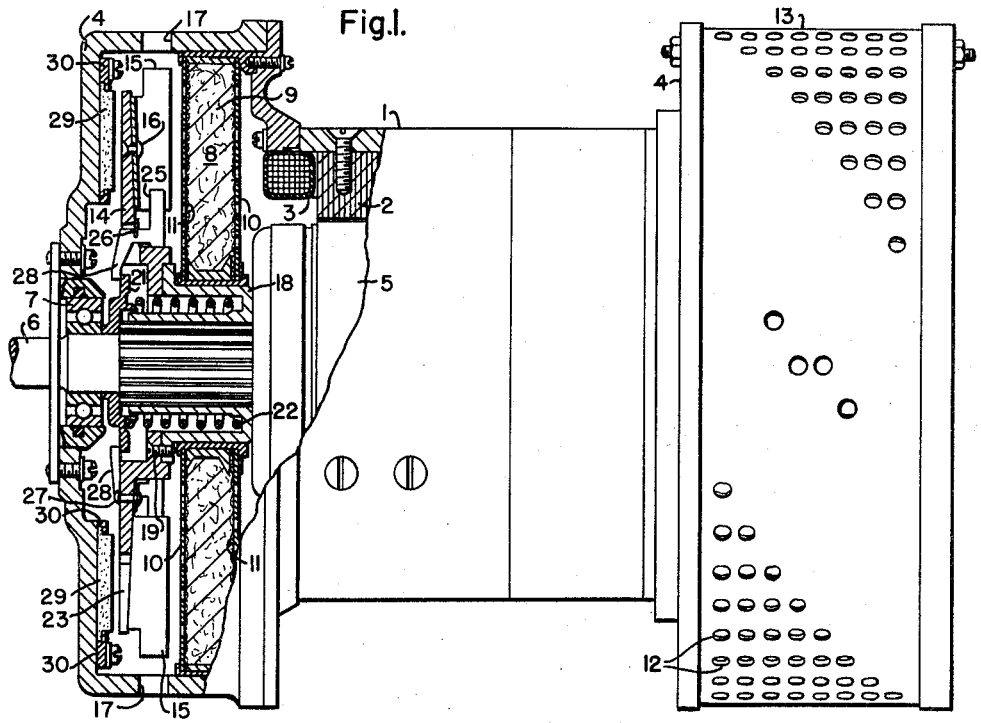
Figure 2:
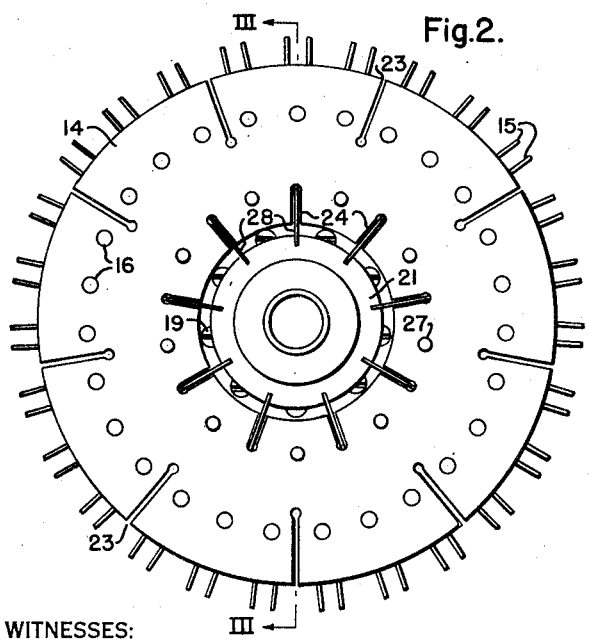
Figure 3:
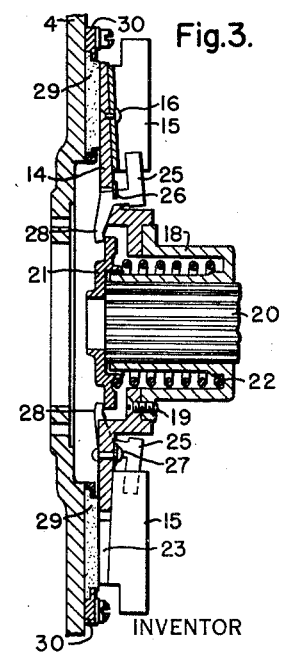

Other objects and advantages of the invention will be apparent from the following detailed description, taken in connection with the accompanying drawing, in which:

Figure 1 is a view, partly in elevation and partly in longitudinal section, showing a dynamo-electric machine embodying the speed-limiting device of the present invention, Fig. 2 is a view in elevation of the disk or fan element of the speed-limiting device, and Fig. 3 is a fragmentary sectional view of the speed-limiting device showing the parts in their actuated position.

The invention is shown in the drawing applied to an explosion-proof motor for aircraft use, of the type disclosed and claimed in a copending application of H. D. Else and P. J. Weber, Serial No. 125,557, filed November 4, 1949, and assigned to Westinghouse Electric Corporation, although it is to be understood that the invention is of general application, and that its usefulness is not limited to motors of this particular type. The motor shown in the drawing has a frame member 1 on which are mounted pole pieces 2 carrying field windings 3, and the ends of the frame member 1 are closed by end brackets generally designated 4. The motor also has an armature, or rotor member 5, of any suitable type mounted on a shaft 6 supported in anti-friction bearings 7 in the end brackets 4.

As more fully described in the above-mentioned copending application, the motor is made explosion-proof by means of a flame suppressor 8 interposed in the path of the ventilating air. The flame suppressor 8 consists of a mass of metal wool 9, preferably of copper or aluminum, supported between perforated metal plates 10, with a layer of fine-mesh wire screening 11 inside the perforated plates. The flame suppressor 8 thus provides a porous metal body having a multiplicity of small air passages therethrough, and acts to cool heated gases escaping from the machine in case of an internal explosion, quenching the flame and preventing ignition of inflammable gases or vapors on the outside of the motor. A similar flame suppressor may be provided in the end bracket at the opposite end of the machine, or a flame suppressor of a radial type, embodying the same construction may be utilized, as disclosed in the above-mentioned application, the air or hot gases entering or leaving the opposite end of the machine passing through perforations 12 in a metal cover 13.

The speed-limiting device, which forms the subject matter of the present application, includes an annular metal disk element 14 which has a plurality of fan blades 15 secured to it by rivets 16, or by brazing, or in any other suitable manner. The fan blades 15 constitute a ventilating fan for the motor to draw ventilating air through it, the air being discharged through suitable openings 17 in the end bracket 4. The disk element 14 is mounted on a hub member 18 by means of screws 19. The hub member 18 is internally splined, as indicated at 20, and engages corresponding splines on the shaft 6, so that the hub member 18 rotates with the shaft but is axially movable on the shaft. A collar 21 is mounted on the shaft adjacent the hub member 18, by pressing or otherwise, and is secured between a shoulder on the shaft and the inner race of the bearing 7, as clearly shown in Fig. 1, so that the collar 21 is axially fixed on the shaft. The hub member 18 has an annular recess formed in it, and a compression spring 22 is disposed in the recess and engages the collar 21, so that the spring 22 biases the hub member 18 and disk element 14 away from the end bracket and towards the armature 5, or to the right, as viewed in Fig. 1.

The disk element 14 may have a plurality of radial slots 23 in its outer periphery, to provide some resilience, and it has a plurality of radial slots 24 in its inner periphery. Weight members 25 are disposed in the slots 24, and are connected to the disk element 14 by means of an annular member 26. The member 26 may be an annular piece of spring steel, or other material of suitable hardness to withstand wear, encircling the inner periphery of the disk element 14 and secured to it by rivets 27, and the weight members 25 are provided with notches which engage the annular member 26 to connect the weight members to the disk element 14 and to retain the weight members in place in the slots 24. Each of the weight members 25 has an inwardly extending leg 28 which engages the outer periphery of the axially fixed collar 21. A plurality of friction blocks 29 are secured to the inside surface of the end bracket 4 by means of retaining rings 30. The blocks 29 are preferably carbon blocks, although any suitable friction material might be used, and their surfaces are disposed in a plane substantially parallel to the adjacent surface of the disk element 14.

In normal operation of the motor, the parts are in the position shown in Fig. 1, the disk element 14 being held in the position shown by the spring 22, which urges the hub 18 towards the right, with the weight members 25 resting against the hub 18. When the speed of the motor exceeds a predetermined limit, however, which is preferably somewhat less than the maximum speed the motor is to be permitted to attain, the centrifugal force acting on the weight members 25 causes them to move outward. Since the legs 28 of the weight members 25 are in engagement with the axially fixed collar 21, the weight members pivot about this point of engagement to the position shown in Fig. 3, and because of their connection with the disk element 14, through the annular member 26, the disk element is moved to the left to engage the stationary friction blocks 29, the hub 18 sliding axially on the shaft and compressing the spring 22. The motor is thus braked, and its speed limited, by the engagement of the disk element 14 with the stationary friction blocks 29.

Since the speed-limiting device is actuated by centrifugal force, the force with which the disk 14 is pressed against the friction blocks 29 will vary as the square of the speed, and if the speed tends to increase, the braking effect is very strongly increased, so that the maximum speed of the motor is held within the desired limit. The weight members 25 and the spring 22, which opposes their movement, are designed so that the weight members move outward, to move the disk 14 into initial engagement with the blocks 29, at some speed below the maximum permissible limit. Thus, in the particular motor shown in the drawing, the maximum speed that can be permitted is 14,000 R. P. M., and the speed-limiting device is designed so that the disk 14 is first moved into engagement with the friction blocks when the motor reaches a speed of 10,500 R. P. M.

As explained above, if the speed increases above this point, the braking action builds up very rapidly, because of the relation between the speed and the force applied to the disk, and the speed of the motor is positively held within the desired limit.

It will be obvious that when the motor is rotating at high speed, a great deal of energy must be dissipated in the form of heat when the disk 14 engages the friction blocks. For example, in the particular motor referred to above, which is a series motor utilized for driving a cargo hoist for use on airplanes, the overhauling load when lowering may be quite large, in addition to the torque of the motor driving downward, and the energy to be dissipated in the speed-limiting device may amount to as much as three or four horsepower in a motor of relatively small physical size. This makes it necessary to give careful attention to the problem of heat dissipation in the design of the device. The disk 14 must be made of a material which not only has sufficient mechanical strength, but which has high thermal conductivity to permit the heat generated at the braking surface to flow to the fan blades and to be dissipated into the air. It has been found that steel is not a suitable material, since the heat generated is sufficient to raise the rim of the disk to a red heat, causing warping of the disk, and causing the disk to reach a higher temperature than can be permitted in an explosion-proof motor.

The preferred material for the disk 14 is a precipitation-hardening alloy of copper and chromium, which has a very high thermal conductivity. The high thermal conductivity, combined with the large surface area of the disk, provides adequate heat transfer from the braking surface to the fan blades and to the air. Heat transfer to the fan blades can also be facilitated by brazing the blades to the disk, in order to provide a connection of high thermal conductivity, and when a precipitation-hardening alloy is used, brazing has the further advantage that the brazing operation can be carried out in such a manner that the precipitation-hardening is accomplished by the heating incident to the brazing, so that no additional heat treatment of the disk is required, thus eliminating one step in the production of the disk. The number of fan blades 15 utilized is preferably made greatly in excess of the optimum number for efficient action as a fan, fifty-four blades being used in the illustrated embodiment. The use of this large number of blades causes considerable turbulence in the spaces between the blades, and this greatly facilitates heat transfer to the air, thus aiding in the dissipation of heat. The relatively poor efficiency of the device as a fan, because of the large number of blades, is offset by the high speed of the type of machine for which the device is primarily intended, and adequate cooling of the motor is obtained.

It should now be apparent that a speed-limiting device has been provided for dynamo-electric machines which is capable of positively limiting the speed of the machine to a predetermined maximum, and which is capable of dissipating the large amount of heat generated in operation. It will be apparent that the invention is capable of various modifications and other embodiments, and it is to be understood that the invention is not limited to the particular details of construction shown for the purpose of illustration, but in its broadest aspects it includes all equivalent embodiments and modifications which come within the scope of the appended claims.

I claim as my invention:

1. A dynamo-electric machine having a stationary member and a rotating member, a disk element supported on the rotating member and axially movable relative thereto, a plurality of weight members carried on said disk element and pivotally engaging an axially fixed member on the rotating member, said weight members being connected to the disk element and being adapted to move about their pivots under the influence of centrifugal force to move the disk element axially into engagement with a part of the stationary member when the speed of the rotating member exceeds a predetermined limit.

2. A dynamo-electric machine having a stationary member and a rotating member, a disk element supported on the rotating member and axially movable relative thereto, a plurality of weight members carried on said disk element and pivotally engaging an axially fixed member on the rotating member, said weight members being connected to the disk element and being adapted to move about their pivots under the influence of centrifugal force to move the disk element axially into engagement with a part of the stationary member when the speed of the rotating member exceeds a predetermined limit, and spring means opposing axial movement of the disk element.

3. A dynamo-electric machine having a stationary member and a rotating member, a disk element supported on the rotating member and axially movable relative thereto, fixed engaging members on the stationary member having surfaces disposed in a plane parallel to said disk element, a plurality of weight members carried on said disk element and pivotally engaging an axially fixed member on the rotating member, said weight members being connected to the disk element and being adapted to move about their pivots under the influence of centrifugal force to move the disk element axially into engagement with said engaging members when the speed of the rotating member exceeds a predetermined limit, and spring means opposing axial movement of the disk element.

4. In a dynamo-electric machine having a stator member and a rotor member including a shaft, a fan including a disk element and a plurality of fan blades secured thereto, said fan being mounted on the shaft to rotate therewith and being axially movable on the shaft, a plurality of friction blocks mounted on the stator member adjacent the fan and having surfaces disposed in a plane parallel to the disk element, and speed-responsive means on the shaft for moving the disk element axially into engagement with the friction blocks when the speed of the rotor member exceeds a predetermined limit.

5. In a dynamo-electric machine having a stator member and a rotor member including a shaft, a fan including a disk element and a plurality of fan blades secured thereto, said fan being mounted on the shaft to rotate therewith and being axially movable on the shaft, a plurality of friction blocks mounted on the stator member adjacent the fan and having surfaces disposed in a plane parallel to the disk element, and a plurality of weight members carried on the fan and pivotally engaging an axially fixed element on the shaft, said weight members being adapted to move about their pivots and move the disk element axially into engagement with the friction blocks when the speed of the rotor member exceeds a predetermined limit.

6. In a dynamo-electric machine having a stator member and a rotor member including a shaft, a fan including a disk element and a plurality of fan blades secured thereto, said fan being mounted on the shaft to rotate therewith and being axially movable on the shaft, a plurality of friction blocks mounted on the stator member adjacent the fan and having surfaces disposed in a plane parallel to the disk element, a plurality of weight members carried on the fan and pivotally engaging an axially fixed member on the shaft, said weight members being connected to the disk element and being adapted to move about their pivots and move the disk element axially into engagement with the friction blocks when the speed of the rotor member exceeds a predetermined limit, and spring means opposing axial movement of the disk element.

7. In a dynamo-electric machine having a stator member and a rotor member including a shaft, a fan including a disk element and a plurality of fan blades secured thereto, said fan being mounted on the shaft to rotate therewith and being axially movable on the shaft, a plurality of friction blocks mounted on the stator member adjacent the fan and having surfaces disposed in a plane parallel to the disk element, said disk element having a plurality of radial slots therein, and a plurality of weight members disposed in said slots and connected to the disk element, the weight members pivotally engaging an axially fixed member on the shaft and being adapted to move about their pivots and move the disk element into engagement with the friction blocks when the speed of the rotor member exceeds a predetermined limit.

8. In a dynamo-electric machine having a stator member and a rotor member including a shaft, a fan on the shaft, said fan including a hub member axially movable on the shaft, a disk element mounted on the hub member, and a plurality of fan blades secured to the disk element, an axially fixed member on the shaft adjacent the hub member, a plurality of friction blocks mounted on the stator member adjacent the fan and having surfaces disposed in a plane parallel to the disk element, a plurality of weight members carried on the fan and pivotally engaging said axially fixed member, and spring means engaging the axially fixed member and the hub member and biasing the fan away from the friction blocks, said weight members being adapted to move about their pivots and move the disk element axially into engagement with the friction blocks against the opposing force of the spring means when the speed of the rotor member exceeds a predetermined limit.

9. In a dynamo-electric machine having a stator member and a rotor member including a shaft, a fan on the shaft, said fan including a hub member axially movable on the shaft, a disk element mounted on the hub member, and a plurality of fan blades secured to the disk element, an axially fixed member on the shaft adjacent the hub member, a plurality of friction blocks mounted on the stator member adjacent the fan and having surfaces disposed in a plane parallel to the disk element, said disk element having a plurality of radial slots therein, a plurality of weight members disposed in said slots and connected to the disk element, the weight members pivotally engaging said axially fixed member, and spring means engaging the axially fixed member and the hub member and biasing the fan away from the friction blocks, said weight members being adapted to move about their pivots and move the disk element axially into engagement with the friction blocks against the opposing force of the spring means when the speed of the rotor member exceeds a predetermined limit.

HARRY D. ELSE.

REFERENCES CITED

The following references are of record in the file of this patent:

UNITED STATES PATENTS

| Number | Name | Date |
| --- | --- | --- |
| 962,819 | Cowley | June 28, 1910 |
| 2,196,434 | Allstrom | Apr. 9, 1940 |